United States Patent [19]

Katz

[11] Patent Number: 4,715,192
[45] Date of Patent: Dec. 29, 1987

[54] ELECTRICAL OR THERMAL TRACKING COGENERATION SYSTEM UTILIZING OPEN CYCLE-AIR-CONDITIONING

[75] Inventor: Yoram Katz, Los Angeles, Calif.

[73] Assignee: Imperial Private Power, Santa Monica, Calif.

[21] Appl. No.: 61,455

[22] Filed: Jun. 15, 1987

[51] Int. Cl.⁴ .......................................... F25B 27/00
[52] U.S. Cl. .................................. 62/323.1; 62/238.3; 237/12.1; 237/13; 290/2
[58] Field of Search ............. 62/323.1, 272, 92, 238.3, 62/238.6; 237/12.1, 13; 123/41.19; 290/1 A, 2

[56] References Cited

U.S. PATENT DOCUMENTS 4,380,909  4/1983  Sung ..................................... 62/238.3
4,531,379  7/1985  Diefenthaler, Jr. ................. 62/323.1

Primary Examiner—Henry A. Bennet
Attorney, Agent, or Firm—Thomas I. Rozsa

[57] ABSTRACT

The invention is a cogeneration system which utilizes an open cycle air-conditioner in conjunction with an internal combustion engine, a generator, an exhaust heat recovery unit, a hot water heat exchanger, a circulating pump, a load dump heat exchanger and an electrical sensing circuit to enable a single fuel source to produce electricity, hot water, and air-conditioned (cooled or heated) air. In addition to running as a stand alone unit, the system can be used to operate in conjunction with existing electrical utilities. The system can float around the electrical or thermal demand of the facility and adjust itself to the needs of the facility. The system is thermally controlled and electrically controlled, based on need.

9 Claims, 4 Drawing Figures

ELECTRICAL OR THERMAL TRACKING COGENERATION SYSTEM UTILIZING OPEN CYCLE-AIR-CONDITIONING

BACKGROUND OF THE INVENTION

1. Field of the Invention

The present invention relates to the field of cogeneration systems. Cogeneration is the production of two energies from one fuel source. For example, the two energies can be electricity and heat or electricity and air-conditioning. Open cycle air-conditioning operates by dehumidification of incoming air and then cooling the air through a heat exchanger and thereafter cooling the dry air through an evaporative process so that cool air is exhausted into the room. The room air is recirculated back into the air-conditioner so that it pre-cools the incoming fresh air before it is exhausted out to the atmosphere. A major advantage of the open cycle air conditioning system is that a constant supply of fresh and filtered air is delivered to the space which is being cooled while conventional closed systems merely recirculate air from the room where the air is being cooled. The present invention utilizes cogeneration combined with open cycle air conditioning to provide a self contained system which generates electricity, hot water and heated and air-conditioned air.

2. Description of the Prior Art

In general, open cycle air conditioning systems which use desiccant material to absorb moisture from the air are well known in the prior art. U.S. Pat. No. 4,180,985 issued to Northrup, Jr. in 1980 for "Air Conditioning System With Regeneratable Desiccant Bed" as the title states discloses an air-conditioning system with a regeneratable desiccant bed. In this invention, the desiccant material is carried by a continuous belt with "waste heat" serving to remove moisture from the desiccant material. U.S. Pat. No. 4,594,860 issued to Coellner et al. in 1986 for "Open Cycle Desiccant Air-Conditioning System And Components Thereof" discloses an open cycle air-conditioning unit with improvements in the desiccant wheel and improvements in the heat exchanger wheel portion of the unit.

Overall cogeneration systems for heating dwellings are known in the prior art. U.S. Pat. No. 4,065,055 issued to De Cosimo in 1977 for "Complete System For A Home Air Heating And Cooling, Hot And Cold Water, And Electric Power" discloses such a complete unit. The system however is used with a conventional evaporate water cooling system wherein an electric engine is electrically powered from a generator, the electric engine drives a compressor in a cooling circuit with a cooler and a condenser. This cooling system is connected by a pump and a pipe to a spray head located inside an air duct for spraying the moving air duct with cold water to cool off the same. Furthermore, the system does not provide any means to control the electrical or thermal output to match the facility demand. In De Cosimo, there is also shown a gasoline engine which serves to power an electric generator to produce electric power for the building. Hot exhaust gases from the engine pass through a heat exchanger to heat water.

U.S. Pat. No. 4,010,378 issued to Tharpe et al. in 1977 for "Integrated Electric Generating And Space Conditioning System" shows a system wherein vapor from an expander or rotary prime mover is conveyed to a heat exchanger serving to heat fluid such as water or air. The rotary prime mover also powers an alternator serving to produce electricity. The rotary prime mover or expander may also serve to power a compressor to provide air-conditioning. Once again, the air conditioning is supplied in a conventional closed cycle apparatus. The system serves to supply electricity, heat and power to drive the compressor.

The following prior art reference also disclose various types of cooling systems:

1. U.S. Pat. No. 4,380,910 issued to Hood et al. in 1983 for "Multi-Stage Indirect-Direct Evaporative Cooling Process And Apparatus".

2. U.S. Pat. No. 2,239,886 issued to Feldbush et al. in 1941 for "Power Plant Refrigerating System".

3. U.S. Pat. No. 2,339,903 issued to Alexander in 1944 for "Refrigerating Apparatus".

4. U.S. Pat. No. 2,491,314 issued to Hopkirk in 1949 for "Turbogenerator Cooling System".

None of the prior art disclose any type of apparatus which can be used in conjunction with an open cycle air-conditioning/heating system for efficiently providing electricity, heat and air-conditioning from a single fuel source. In addition, none of the prior art references disclose a system which can be used in junction with the existing heating and cooling system of a facility to provide an overall more efficient use of the system. In addition, none of the prior art references disclose a system where the amount of electrical or air-conditioning output is controlled to match the facility demand.

Present day heating and cooling systems for facilities such a restaurants are extremely inefficient. Power is used during the peak times of the day when it is more expensive and the system does not provide for a method of utilizing power during non-peak hours when it is less expensive. In addition, present day systems require use of power throughout the day and in the evening for even when the facility is closed, burglar alarms, refrigerators and other operations which require power must be kept operational. None of the cited references disclose a system wherein a cogeneration system can be used in conjunction with an existing electrical and air-conditioning facility to provide an overall more efficient system that can accommodate facility load fluctuation, including electrical, cooling and heating.

Therefore, a significant need exists for an efficient cogeneration system which can generate electricity, heat and air-conditioning from an open cycle air-conditioning system. A further significant need exists for such a system which can be used in conjunction or to supplement the existing heating and air-conditioning system of a given facility.

SUMMARY OF THE PRESENT INVENTION

The present invention relates to an improved cogeneration system which produces heated water, electricity, and air-conditioning/heated air through an open cycle air-conditioning/heating system, all from a single fuel source.

The present invention also relates to a cogeneration system which in addition to providing an efficient stand alone system, also provides a cogeneration system which can be used in conjunction with an existing facility and with the existing power and air-conditioning/heating systems of a given facility to provide an overall extremely efficient use of energy. The present invention permits the system to stand alone and adjust itself automatically to the facility energy needs or to draw excess power from commercially available sources, but only when needed to fill peak load requirements. The system also permits use of only commercial utility sources of electricity if the power requirements fall below efficient use of the cogeneration system.

It is therefore an object of the present invention to provide a cogeneration system through which electricity, hot water and heating and/or cooling can be generated under controlled conditions from a single fuel source, which system includes an open cycle air-conditioner.

It is another object of the present invention to provide a cogeneration system which can be operated as an independent unit and can also be used in conjunction with commercially available sources of power.

It is a further object of the present invention to provide a cogeneration system which can thermally track the requirements of the facility in order to bring into the system a load dump heat exchanger to cool the engine in the event the air-conditioning source of cooling is only partially used or not used at all.

It is yet another object of the present invention to provide a cogeneration system which can be electrically track the facility electrical requirements in order to determine if supplemental sources of power are required to fulfill the system needs at a given time or if the cogeneration electrical output must be curtailed to match the facility needs.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
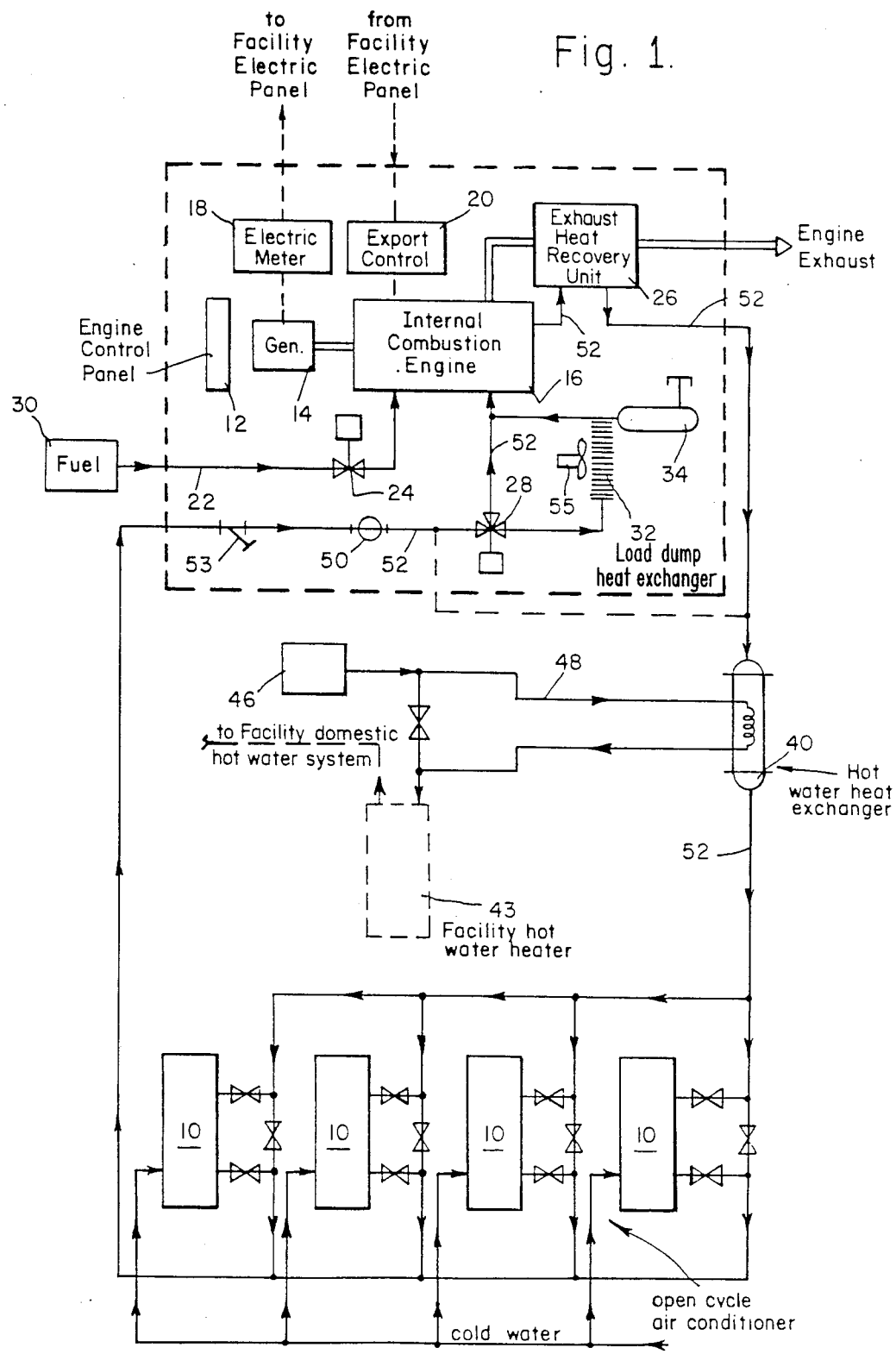
FIG. 1 is a schematic representation of the present invention cogeneration system, shown in stand-alone configuration and with connecting apparatus to commerical sources of power.

Referring to FIG. 1, there is shown at 1 a schematic diagram of the overall cogeneration system of the present invention in a "stand alone" embodiment. The cogeneration system 1 is design to work with at least one open cycle air-conditioning system 10. In the preferred embodiment, a multiplicity of open cycle air-conditioning systems 10 are connected to each other as illustrated in FIG. 1. While four such units 10 are shown in FIG. 1, it will be appreciated that any number of such open cycle air-conditioning units 10 can be used with the present invention.

By way of example only, in one typical open cycle air-conditioning unit 10 which can be used with the present invention, in the air cooling mode, air enters the system and is forced through a desiccant wheel to remove moisture therefrom. Thereafter, the air enters a rotary regenerative heat exchanger wheel wherein the heat is transferred from the air to the wheel structure. Evaporator means is then utilized to humidify and cool the air and then the air is exhausted into the room area to be cooled. Exhaust air from the room which is cooled returns into the unit and is first evaporatively cooled, and then passes through the regenerative heat exchanger cooling the structure and heating the air. Heat removed from the air which was sent to into the cooled room is added to such exhaust air. The air is further heated as it passes through a liquid-to-heat exchanger with the fluid heat source being a gas fired boiler. The hot exhaust air passes through the desiccant structure heating and drying (regenerating) the desiccant for reuse. Thereafter, the hot air is exhausted to the atmosphere and new fresh cooler air is taken from the atmosphere and fed into the system from which it goes through the desiccant wheel, etc. Alternatively, in the air heating mode, the air-conditioner 10 can also comprise a heating coil so that after air leaves the heat exchanger, it is heated rather than cooled before it is exhausted into the room whose air is to be treated. An open cycle air-conditioner comparable to this is also disclosed in U.S. Pat. No. 4,594,860 issued to Coellner et al. for "Open Cycle Desiccant Air-Conditioning System And Components Thereof". It is emphasized that this is only one type of open cycle air-conditioning system which can be used with the present invention congeneration system 1, and other types of open cycle air-conditioning systems, whether using a desiccant wheel or otherwise, are within the spirit and scope of present invention. In the embodiment shown in FIG. 1, a conventional open cycle air-conditioner 10 will require approximately 30,000 BTU for 3-3.5 Tons of cooling. In the system as shown in FIG. 1 which uses four such devices 10, the power requirements to drive all four devices 10 will require a 23 Kilowatt engine.

The cogeneration system 1 contains an internal combustion engine 16 connected to generator 14. The engine 16 is supplied with liquid or gas fuel 30 which runs through pipe line 22 and is turned on and off by means of fuel valve 24. The engine control panel 12 regulates the engine 16 to control the amount of power produced by the generator 14 and monitor other engine vital functions. The fuel 30 runs internal combustion gas engine 16 which powers the generator 14 which generates the electricity which is supplied to the facility. The engine generator 14 generates the electricity which is used in the facility. Also attached to the engine 16 is a load dump heat exchanger 32 which in turn is connected to expansion tank 34. The engine 16 must be cooled. When all systems are running, the cooling from the open cycle air-conditioning systems 10 and the hot water heat exchanger 40 cool the engine 16. However, at periods of time when only partial air-conditioning is needed or no air-conditioning at all, such as in the evening, the open cycle air-conditioning units 10 are shut down by means of an automatic thermostat while the engine 16 continues to run in order to run the generator 14 to supply electricity. Therefore, the load dump heat exchanger 32 is activated by means of a three way thermostatic valve valve 28 in order to cool the engine 16.

The cogeneration system water or similar fluid 52 is circulated through the system by means of pump 50. The cogeneration system water 52 is circulated through a conventional engine jacket (not shown) on the gas engine 16 and thereafter through the engine exhaust heat recovery unit 26 which thereby serves to recover heat from the engine exhaust to the water 52.

The congeneration system water 14 is also used to run a hot water heat exchanger 40 which is used to supply domestic hot water to the building. Cold water 48 from cold water supply 46 which normally enters the facility hot water heater 43 is preheated by the cogeneration heat exchanger 40 and stored in the hot water heater 43. The latter will cause the facility hot water heater not to be activated by its burner, thus saving energy. The hot water boiler of conventionally fired open cycle air-conditioner 10 is replaced with the hot water generated by the jacket water and the exhaust of the engine generator. Therefore, instead of requiring a fuel fired boiler to heat water which is used to heat air and dry the desiccant material, the hot water 52 coming from the cogeneration system fulfills this purpose. Hot water from the internal combustion engine water jacket (which became hot while cooling the engine) is used to circulate through the exhaust heat recovery unit 26 and further heat the cogeneration fluid 52. In the heat exchanger 40 the cogeneration water 52 gives up some of its heat to preheat cold water 48. Some of this hot water is transferred to the facility and is stored in the hot water heater 43. The remainder of the cogeneration hot water 52 is circulated to the open cycle air-conditioners 10 to be used as the hot water which heats return air which in turn drys the desiccant material which in turn drys the fresh incoming air. A circulating pump 50 with a suction strainer 53 is used to circulate the cogeneration hot water 52 to the domestic hot water heat exchanger 40 and the open cycle air-conditioner 10.

Therefore, in the stand-alone system of the present invention, a source of liquid or natural gas 30 supplies fuel to an engine 16 which runs the generator 14 which in return generates electricity which is used to supply electric power to a building or other facility and is also used to run the hot water heater 40 to supply domestic hot water and to run the open cycle air-conditioners 10 to supply either cold or hot air. The hot water 52 from the engine 16, jacket and exhaust, is also used to run one or more open cycle air-conditioners 10 and a domestic hot water heat exchanger which in turns heats domestic water into hot water. The open cycle air-conditioners are used to provide air-conditioned air to the building. In an optional embodiment, the open cycle air-conditioners can also contain a hot water heat exchanger so that air is heated instead of cooled to provide air-heating instead of air-conditioning or cooling during cold days.

The engine 16 is also supplied with a load dump heat exchanger 32 which serves to cool the engine 16 in the event the air-conditioners 10 or portion of the air-conditioners 10 are not running. A circulating pump 50 serves to circulate water through the engine jacket and through the engine exhaust heat exchanger and to the domestic hot water heat exchanger 40 and from there to the air-conditioners 10 and then back through the pump 50 to the load dump heat exchanger 32. When the air-conditioners 10 are not in the cooling or heating mode (or only partially in the cooling or heating mode), the load dump heat exchanger 32 provides cooling to the engine 16 by means of an electric driven fan 55. The three way thermostatic valve 28 senses the hotter water and activates the flow so that the load dump heat exchanger 32 and electric fan 55 is brought into the flow circulation to provide cooling water to the engine water jacket. The expansion tank 34 allows the water to expand as it is heated.

By way of example, water leaving the engine and exhaust heat recovery unit can be at 195 degrees Fahrenheit and flowing at 20 gallons per minute as it enters the heat exchanger 40. Water leaving the heat exchanger 40 can be at 190 degrees Fahrenheit. As water enters the air-conditioners 10, it can be flowing at 5 gallons per minute and be at 190 degrees Fahrenheit to each of the four units. Water leaving the air conditioners can be at 180 degrees Fahrenheit. The three way thermostatic valve 28 can be set at 180 degrees Fahrenheit. If the water is hotter than this, the load dump heat exchanger 32 and fan 55 is used.

Therefore, through use of the present invention cogeneration system 1, heated water, electricity, and air-conditioning (or air-heating) can all be generated from a single gaseous or liquid fuel source.

Figure 2:
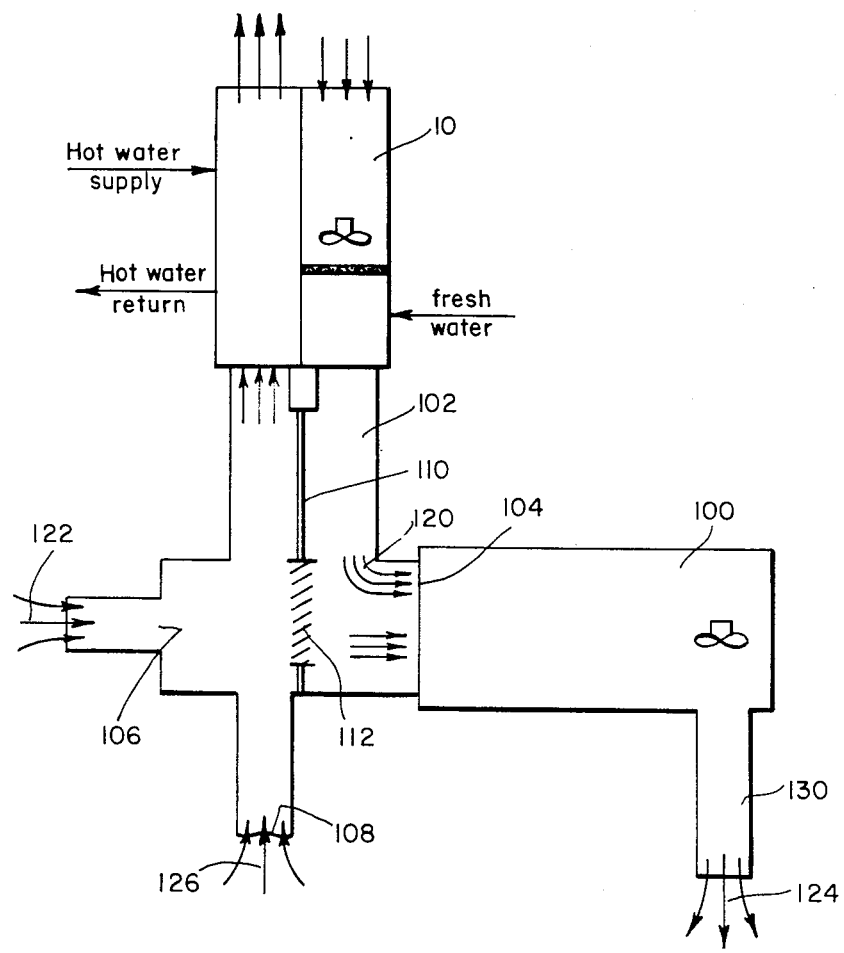
FIG. 2 is a schematic representation of a portion of the present invention cogeneration system used in conjunction with the existing air-conditioner/heater of a facility, with the systems interconnected by a given embodiment.
Figure 3:
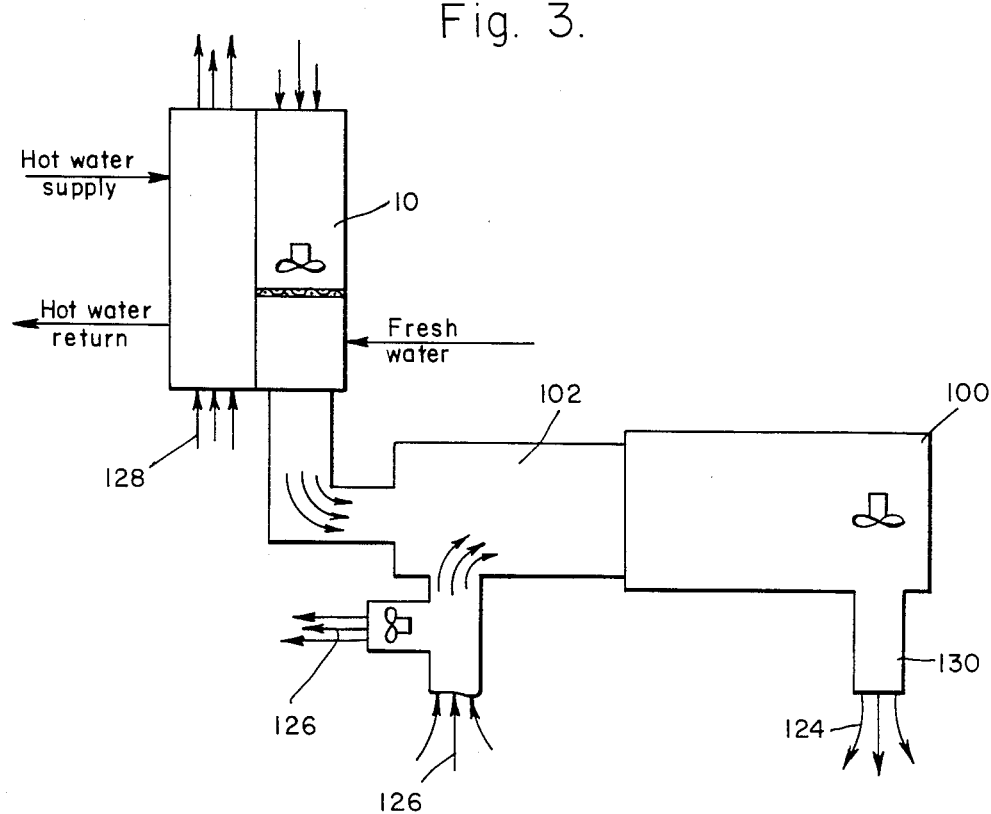
FIG. 3 is a schematic representation of a portion of the present invention cogeneration system used in conjunction with the existing air-conditioner/heater of a facility, with the systems interconnected by an alternative embodiment.

In addition to being used as a stand-alone system, the present invention cogeneration system 1 can also be used in conjunction with the existing cooling or heating facilities of a structure. For example, the cogeneration system 1 can be used in conjunction with the air-conditioning/heating units already in place in a facility to pre-cool or pre-heat the air prior to its entering the existing units in order to substantially reduce the air-conditioning or heating loads and thus costs of the energy of the facility. Two different arrangements are shown in FIGS. 2 and 3 respectively. Referring to FIG. 2, there is shown a schematic view of the relevant portion of cogeneration system 1 and the existing air-conditioning/heating unit 100 of a facility. The air-conditioner 10 of the present invention system is aligned with the air-conditioner 100 of the facility through appropriate ducting 102 such that the cold air supply port 102 of air-conditioner 10 is aligned with air-intake port 104 of the facility air conditioning and heating unit 100. The ducting 102 includes fresh air intake port 106 and the facility return air intake port 108. The ducting 102 also includes separator wall 110 and louvres 112. The open cycle air-conditioner 10 of the present invention cogeneration system 1 is aligned in series with the existing air-conditioner/heater 100 so that the cooled or heated air air 120 which would ordinarily be sent into the room to be cooled or heated is instead sent into the intake port 104 of the existing air-conditioning/heating unit 100 and is also combined with fresh air 122 taken from the atmosphere through portion 106. If louvres 112 are opened, the atmospheric air 122 and facility return air 126 can pass to the intake port 104 of air-conditioner 100 so that the overall input air volume matches the existing requirement of unit 100 to be pre-cooled or pre-heated (as the case may be). This substantially reduces the load on the existing unit 100 and therefore substantially reduces the overall cost of operating the existing facility since substantially less power from utilities must be purchased to run the existing unit 100. In addition, since all of the ducting and other structures associated with the air-conditioning and heating unit 100 are already in place, no additional structural alterations are required. The cogeneration system 1 is merely hooked up to the existing facility 100 so that the exhaust port for cooled or heated air from the open cycle air-conditioner 10 is connected to the intake port of the existing air-conditioner/heater 100. Air-conditioned air 124 is sent into the facility existing ducting system 130. In the embodiment shown in FIG. 2, return warmer air 126 from the facility enters through return air intake port 108. With the louvres 112 in the closed position, the air is mixed with fresh air 122 to match the air conditioning 10 air volume and recirculates back through the open cycle air-conditioner 10 to regenerate the desiccant, as previously described and thereafter to be exhausted to the atmosphere. In the alternative embodiment shown in FIG. 3, the return air from the facility is exhausted to the atmosphere and fresh air 128 from the atmosphere enters the open-cycle air-conditioner intake to recycle the desiccant. In this embodiment, the louvres are eliminated. By way of example, referring to FIG. 2, if fresh air (1200 CFM) at 80 degrees Fahrenheit enters a three ton capacity open cycle air-conditioner 10, it will be cooled to 55 degrees Fahrenheit before entering the facility air conditioner 100. This is combined with additional fresh air (at 800 CFM) also at 80 degrees Fahrenheit to produce 2000 CFM of air at 60 degrees Fahrenheit exiting the facility air-conditioner 100 (which by way of example can be a 5-ton unit). The return air from the facility can be at 78 degrees Fahrenheit and running at 1700 CFM. Approximately 1200 CFM is used to recycle the desiccant in the open cycle air-conditioner 10 while 800 CFM is utilized from the facility return air, for a total of 2000 CFM into the facility air conditioner 100.

In addition to running as a stand-alone unit, the present invention cogeneration system 1 can be used to operate in conjunction with existing electrical utilities. The cogeneration system can be connected to incoming commercial electrical power sources so that peak electrical needs can be met by the local electrical utility. In this way, when the existing engine 16 is generator 14 can supply all of the required power output needed by the facility, the utility supply is automatically shut off and no additional electrical power expense is incurred. When the demands of the facility on a particularly hot day require additional power, the electrical gate is opened and additional electricity up to the required amount is drawn from the utility power source. Also, it is not economical to run any internal combustion engine below 60% of its capacity. In certain conditions when the facility power requirement falls below the 60% engine output level such as when the facility may be closed but some power must be drawn to run evening lights, the refrigerator, the burglar alarm, etc., the engine 16 and its generator 14 are shut down and electricity will be drawn entirely from the commercial source for the limited power needed. In the morning when high power demands are required to run the air-conditioner for cooling or heating and various electric fans, a switch triggers the system so that the commercial source is shut off and the engine generator is fired up to generate the required electricity.

Figure 4:
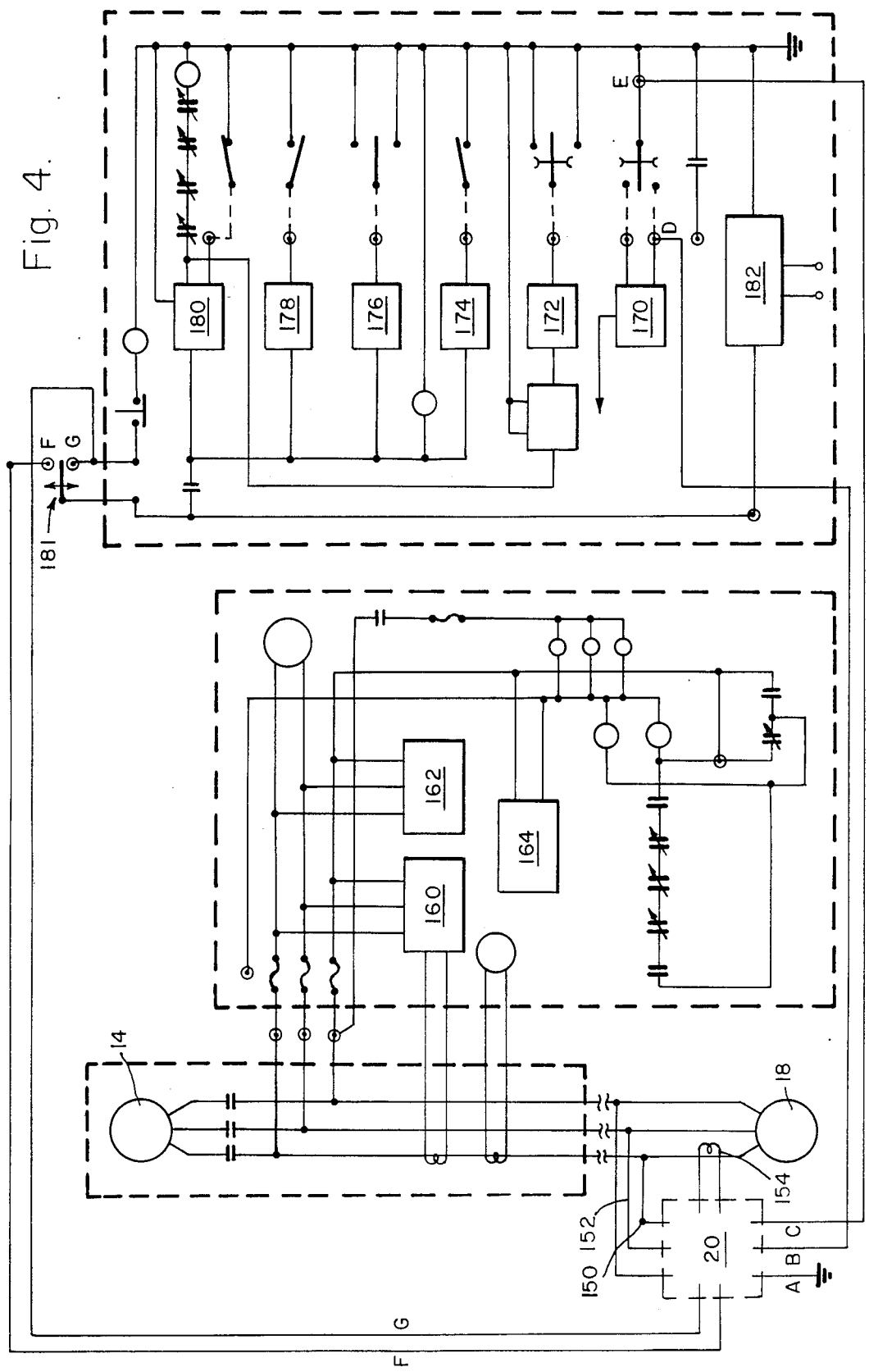
FIG. 4 is a circuit diagram of the control system which enables the present invention cogeneration system to either act in stand-alone mode and function in accordance with the facility needs or to switch to supplemental use of power from commercial sources.

Referring to the schematic representation as shown in FIG. 1 and the wiring schematic as shown in FIG. 4, the facility utility meter is shown at 18. The meter 18 is connected to export load controller 20 via current flow detecting relays 150 and 152. Current sensor 154 senses the amount of current that is flowing from the utility to the cogeneration system or from the cogeneration system to the utility. The meter 18 is also connected to generator 14. When the engine is running at maximum rated power, no current is drawn from the utility. When additional electrical power is needed by the facility (more than then engine 16 can supply) or when the engine 16 is shut off, electrical current will start flowing from the meter 18. Also contained within the circuit is (1) a reverse power relay 160; (2) an over-under voltage protective switch gear 162 (to shut the engine down in the event of an overload); and (3) an over-under frequency relay 164. The circuit also contains a throttle actuator 170 which sits next to the carburetor of the engine 16. The circuit also contains relays 172, 174, 176, 178 and 180 and a 12 volt DC power supply 182.

The cogeneration module includes an electrical load controller which start-stops and controls the engine generator output in accordance with the facility electrical demand. The electrical load control system consists of two primary elements. One is export load controller 20 located next to the facility electrical meter and second is a mechanical linkage throttle actuator 170 which sits on the engine next to the carburetor. The throttle actuator 170 converts the signal from electrical to linear mechanical. The export load controller 20 consists of two current flow detection relays, one for each direction of flow (to or from the facility) 150 and 152 and one current transformer 154 which measures the amount of current flow. The two current detection relays are used to sense the direction of current flow which in turn starts or stops the engine/generator whereas the current transformer by means of 0-5 amp proportional signal is used to control the engine electrical output to match the facility electrical demand. The throttle actuator 170 has a built in D.C. motor which activates a mechanical linkage to the engine carburetor. The throttle actuator is connected to the export load controller by means of three wires, A, B, and C shown in FIG. 4. Wire A is a ground wire. Wire B is connected to gate D and is used to increase engine speed. Wire C is connected to gate E and is used to decrease engine speed. There are two electrical contacts on the actuator connected to the three wires. Each of the contacts turns the D.C. motor in one direction. The contactor will reach equilibrium and just "float" as the load between the engine and the facility are matched. Two wires F and G from the current detection relays are connected to the engine/generator start and stop button 181.

Whenever the current flows in the direction of the facility, the engine/generator will run and produce power (electrical) at full rated capacity. As the facility electrical demand falls below the engine-generator output it will be sensed by the current transformer 154 which will send a signal to the throttle actuator 170 which will activate the D.C. motor which will activate the mechanical linkage adjusting the engine/generator output until the output matches the facility demand. As the facility demand increases, again it is sensed by the current transformer 154 and the process is reversed. The load controller 20 is set such that whenever the facility electrical demand falls below 60% of the engine-generator rated electrical output, a signal F will be sent from one of the current detection relays to stop the engine. Once the facility power demand has increased to above the 60% level, the other current detection relay G will send a signal to start the engine.

Therefore, through use of the present invention, the entire system can float around the demand of the facility and the system adjusts itself. It is a dynamic demand situation. The system is designed to work in conjunction with the public utility. The system is thermally regulated with cooling of the engine supplied either by the open cycle air conditioning system or the load dump heat exchanger, and electrically regulated with electrical demand "floating" and excess electricity from the utility acquired as necessary. In addition to drawing power to meet the facility demand, the system can also be set to "sell" excess power back to the utility if an excess is generated. The system will then be set to thermally track so that heating or cooling demand starts, and stops the engine/generator. As power requirements are reduced, the engine is slowed down and eventually shut off if less than 60% of the rated power of the engine is used. In addition, the hot water demand of the cogeneration system is used to control the engine/generator. When the hot water reaches a certain temperature in the system and no further heating or cooling is required, a temperature causes the engine to stop.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus and method shown are intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A cogeneration system comprising:
   a. generator;
   b. an internal combustion engine for driving said generator;
   c. a fuel source connected to said internal combustion engine
   d. valve means for regulating the amount of fuel supplied to the internal combustion engine;
   e. an exhaust heat recovery unit connected to said engine;
   f. a hot water heat exchanger connected to said exhaust heat recovery unit;
   g. at least one open cycle air-conditioner connected to said hot water heat exchanger;
   h. a pump for circulating fluid through the cogeneration system;
   i. a load dump heat exchanger;
   j. fan means associated with said load dump heat exchanger; and
   k. three way valve means regulating fluid flow between said pump means, said load dump heat exchanger, and said engine;
   l. whereby fuel is supplied to said internal combustion engine through the interconnecting valve means, the internal combustion engine runs said generator which generates electricity to operate said hot water heat exchanger and said open cycle air-conditioner, and said pump circulates fluid which has been cooled by said at least one open cycle air-conditioner through said internal combustion engine to cool the internal combustion engine, from the internal combustion engine through said exhaust heat recovery unit, from the exhaust heat recovery unit through said hot water heat exchanger, from the hot water heat exchanger through said at least one open cycle air conditioner, to said three way valve means which regulates the water flow either directly to said internal combustion engine or through said load dump heat exchanger if the open cycle air-conditioner is not operating or only partially operating, and back through said internal combustion engine.

2. The invention as defined in claim 1, further comprising:
   a. a source of water connected to said hot water heat exchanger; and
   b. a facility hot water heat exchanger;
   c. whereby water from the source of water is circulated through said hot water heat exchanger and is thereby preheated before being routed to said facility hot water heat exchanger.

3. The invention as defined in claim 1 wherein said open cycle air-conditioner is aligned with the air-conditioner of a facility through ducting such that the cold air supply port of the open-cycle air conditioner is aligned with the air intake port of the facility air-conditioner to thereby pre-heat or pre-cool air before it enters the facility air-conditioner.

4. The invention as defined in claim 3 further comprising:
   a. ducting connecting the air-conditioned air exhaust port of said at least one open cycle air conditioner of the cogeneration system to the air intake port of the facility air-conditioner; and
   b. said ducting further comprising a fresh air intake port, a return air intake port, and a separator wall including adjustable louvres which separates the fresh air intake port and return air intake port from the intake port of the facility air-conditioner;
   c. whereby with the louvres in the opened position, air-conditioned air from said at least one open cycle air-conditioner is combined with fresh air and return air from the air-conditioned area so that the overall input air volume to the facility air conditioner matches the existing requirement of the facility air conditioner, and with the louvres in the closed position, fresh air is combined with return air from the air-conditioned area and routed back into the open-cycle heat exchanger.

5. The invention as defined in claim 3 further comprising:
   a. ducting connecting the air-conditioned air exhaust port of said at least one open cycle air conditioner of the cogeneration system to the air intake port of the facility air-conditioner; and
   b. said ducting further comprising a return air intake port;

c. whereby air-conditioned air from said at least one open cycle air-conditioner is combined with return air from the air-conditioned area so that the overall input air volume to the facility air conditioner matches the existing requirement of the facility air conditioner.

6. The invention as defined in claim 1 further comprising:
   a. an electric meter connected to the electric panel of a facility and to said generator;
   b. an export load controller which start-stops and controls said generator in accordance with the required electrical output;
   c. a first current flow detecting relay for detecting current flow from the cogeneration system to a facility;
   d. a second current flow detecting relay for detecting current flow from a facility to the cogeneration system;
   e. a current transformer for measuring the amount of current flow and controlling the engine electrical output to match the facility electrical demand;
   f. said electric meter and said export load controller connected through said first and second current flow detecting relays; and
   g. a mechanical linkage throttle actuator including means for increasing and decreasing engine speed connected to the carburetor of said engine;
   h. whereby, whenever the current flows in the direction of the facility, the engine will run and cause the generator to produce electrical power at full rated capacity and when the facility demand falls below the engine-generator output it will be sensed by said current transformer which will send a signal to said throttle actuator which will adjust the engine speed until the output of the engine generator matches the facility demand.

7. The invention as defined in claim 6 wherein said export load controller is set such that whenever the facility electrical demand falls below 60% of the engine-generator rated electrical output, a signal is sent from one of the current detection relays to stop the engine.

8. The invention as defined in claim 1 wherein said fuel is gas.

9. The invention as defined in claim 1 wherein said fuel is liquid.

* * * * *